United States Patent [19]

Suzuki

[11] Patent Number: 4,630,500

[45] Date of Patent: Dec. 23, 1986

[54] TRANSMISSION OPERATING DEVICE

[75] Inventor: Kazuhiro Suzuki, Nishinomiya, Japan

[73] Assignee: Nippon Cable System Inc., Takarazuka, Japan

[21] Appl. No.: 758,612

[22] Filed: Jul. 24, 1985

[30] Foreign Application Priority Data

Jun. 14, 1985 [JP] Japan .................... 60-130341

[51] Int. Cl.$^4$ .................... G05G 9/16; G05G 9/02
[52] U.S. Cl. .................... 74/473 R; 74/471 XY
[58] Field of Search .......... 74/471 XY, 473 R, 473 P; 137/636.2

[56] References Cited

U.S. PATENT DOCUMENTS 3,338,269  8/1967  Carbert et al. .................. 137/636.2
3,479,899  11/1969  Romi ................................ 74/473
4,526,204  7/1985  Primdahl .................... 74/471 R X

FOREIGN PATENT DOCUMENTS

54-149135  11/1979  Japan .
979574  1/1965  United Kingdom .

Primary Examiner—Allan D. Herrmann
Attorney, Agent, or Firm—Armstrong, Nikaido, Marmelstein & Kubovcik

[57] ABSTRACT

A transmission operating device comprises: a frame a change speed lever supported on the frame by a first ball joint, a first control cable and a second control cable extending in the plane crossing with an axis of the change speed lever and being arranged substantially parallel to each other, a bell crank being provided on the frame so as to rotate around a first axis extending substantially parallel to the change speed lever and having a first arm extending in the direction crossing with the first control cable and a second arm extending substantially parallel to the second control is connected with the change speed lever so as to rotate around a second axis crossing with the axis of the change speed lever, has the other end connected with the second arm by means of a second ball joint, and extends in the direction crossing the second arm. One end of the first control cable is connected with the first arm, and one of the second control cable is connected with the change speed lever. When operating the change speed lever in the direction perpendicular to the control cables, an inner wire of one of the control cables is smoothly pushed or pulled. When the operating in the direction parallel to control cables, an inner wire of the other control is smoothly pushed or pulled. The structure of the device is simplified and parts of the device are sporadically assembled.

4 Claims, 10 Drawing Figures

TRANSMISSION OPERATING DEVICE

BACKGROUND OF THE INVENTION

The present invention relates to a transmission operating device and, more particulary, to a transmission operating device using control cables as a means for transmitting an operational force.

A control cable comprises fundamentally a flexible conduit and a flexible inner wire comprising a strand of steel wire, which is slidably inserted into the conduit, and is constructed so as to transmit a push or pull load acted on one end of the inner wire to the other end in order to operate a remote driven device.

A transmission operating device using control cables is recently used as a means for remotely operating a gear transmission in a vehicle such as a front-wheel-drive light motorcar having a front engine and a rear-wheel-drive bus or truck having a rear engine. According to such a transmission operating device, weight and cost thereof are reduced and assembling work is made easy.

In general, such a transmission operating device has two control cables which are arranged parallel to each other. When operating a change speed lever of the device in one direction, the operational force is transmitted to the transmission via one control cable so that a selecting operation can be performed. When operating the change speed lever in the other direction, the operational force is transmitted to the transmission via the other control cable so that a shifting operation can be performed.

Figure 9:
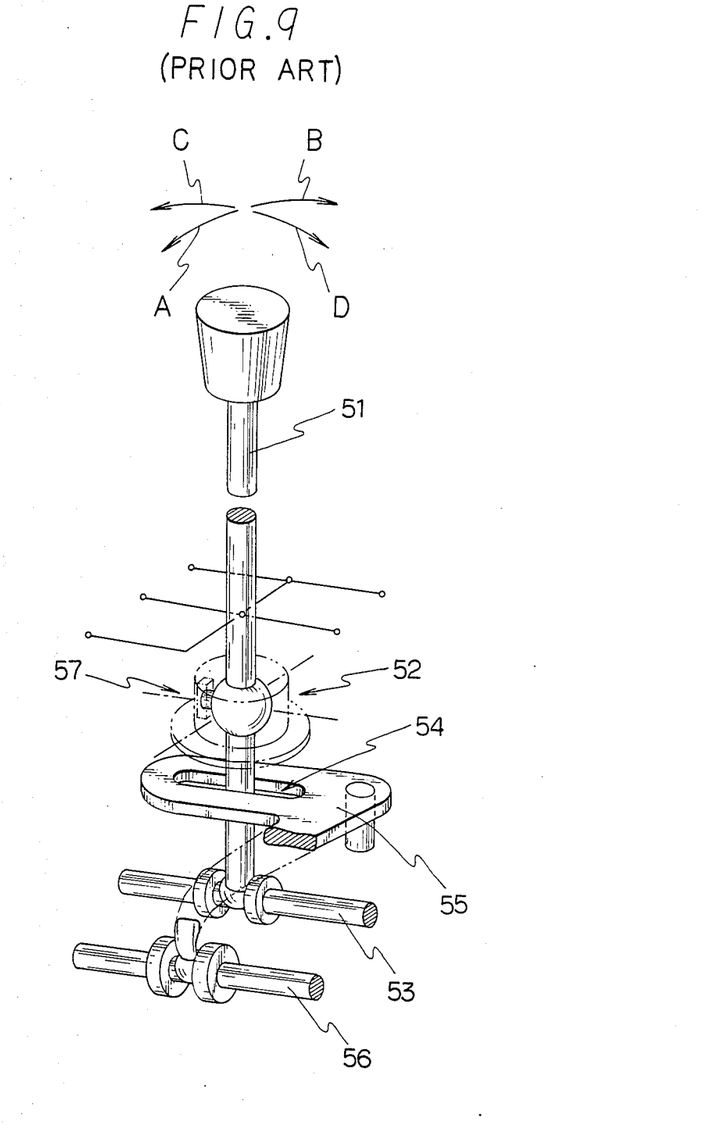
FIG. 9 is a perspective view showing a conventional transmission operating device.

Such a transmission operating device is described in British Pat. No. 979,574. As shown in FIG. 9, the transmission operating device uses a ball joint 52 for supporting a change speed lever 51 to the frame (not shown in the drawing). When the change speed lever 51 is operated in the shifting direction, the operational force is directly transmitted to a shifting rod 53 via a lower end of the change speed lever 51. On the other hand, when the change speed lever 51 is operated in the selecting direction, the operational force is transmitted to a selecting rod 56 via a bell crank 55 having a long slit for allowing the change speed lever 51 to move in the shifting direction without moving the bell crank 55. Further, the transmission operating device is provided with a mechanism 57 for preventing the change speed lever 51 from rotating around an axis of the lever 51.

Figure 10:
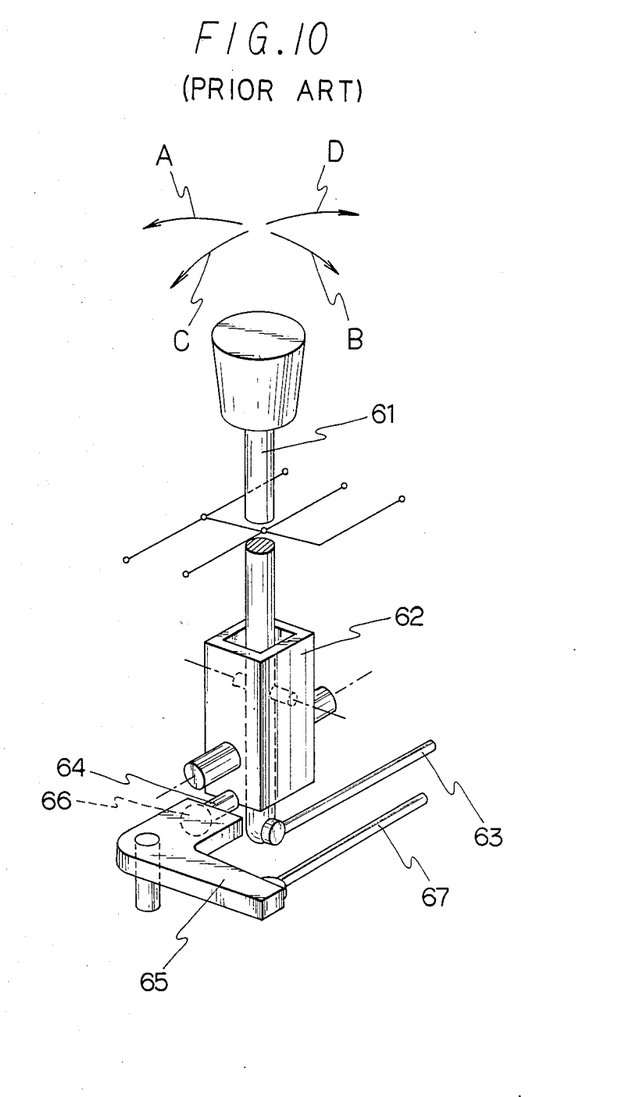
FIG. 10 is a perspective view showing another conventional transmission operating device.

On the other hand, a device described in Japanese unexamined patent publication No. 149135/1979 is also known. As shown in FIG. 10, a change speed lever 61 is provided to the frame (not shown in the drawing) via a carrier 62. The carrier 62 supports the change speed lever 61 so that the change speed lever 61 can be operated in the shifting direction (in the direction of Arrow C or Arrow D), and the carrier 62 per se is supported on the frame so as to rotate in the selecting direction (in the direction of Arrow A or Arrow B). Further, a lower end of the change speed lever 61 is connected with a shifting rod. A projecting member 64 provided in a neighbourhood of the lower end of the carrier 62 is connected with an end of a bell crank 65 via a ball joint 66. The other end of the bell crank 65 is connected with the shifting rod 67.

In the above described devices, a design for arranging each part is disadvantageously complicated, since the mechanism for transmitting an operational force from the change speed lever to the control cable is gathered to a lower portion of the device. Further, an assembling work and a maintenance work are disadvatageously difficult. Further, the device having a ball joint 52 in FIG. 9 requires the mechanism 57 for preventing the change speed lever from rotating around the axis of itself and, therefore, the structure of the device tends to be more complicated.

When constructing a transmission operating device using control cables, in general, it is most important to design a mechanism transmitting a force from the change speed lever to a control cable for selecting. In that case, since it is necessary to construct so that the selecting side cannot be subject to the influence of the shifting operation during the shifting operation, such a transmission operating device satisfying the requirement tends to become complicated and the operation of such device is not smooth.

An object of the present invention is to resolve the above described problems concerning the conventional device, and to provide a transmission operating device in which the mechanism is simplified, and which can be smoothly operated.

SUMMARY OF THE INVENTION

According to the present invention, there is provided a transmission operating device comprising: a frame; a first ball joint provided on a lowered portion of the frame; a change speed lever supported on the frame by means of the first ball joint; a first control cable and a second control cable being arranged substantially parallel to each other and extending in a plane crossing with an axis of the change speed lever; a bell crank being provided on the frame so as to rotate around a first axis extending substantially parallel to the change speed lever and having a first arm extending in the direction crossing with the first control cable and a second arm extending substantially parallel to the second control cable; and a connecting link of which one end is connected with the change speed lever so as to rotate around a second axis crossing with the axis of the change speed lever, and of which the other end is connected with the second arm by means of a second ball joint, and extending in the direction crossing with the second arm, wherein one end of an the first control cable is connected with the first arm, and one end of the second control cable is connected with the change speed lever.

When operating the change speed lever in the plane crossing with the control cables, an end of the connecting link is moved together with the change speed lever and the other end of the connecting link moves the second arm of the bell crank. Therefore, the bell crank is rotated in the plane crossing with the change speed lever and the first control cable is pushed or pulled via the first arm of the bell crank. In that case, a motion of the connecting link is smoothly absorbed by rotating around the second axis and moving with respect to the second ball joint, except the motion that the connecting link rotates the bell crank. At the time, the inner wire of the second control cable is operated in its pushing or pulling direction by operating the change speed lever.

When operating the change speed lever in the direction that the control cable extends from the neutral position or the position where the change speed lever is operated in the plane crossing with the control cables, the inner wire of the second control cable is pushed and pulled. Then, the connecting link is rotated around the second axis and, at the same time, pivotally moved with respect to the second ball joint. Therefore, the bell crank is not rotated to the frame, so that the inner wire of the first control cable connected with the first arm is not pushed or pulled.

Further, the change speed lever is little rotated around an axis of the lever, since the change speed lever is connected with the bell crank via the connecting link and the second control cable is connected with the change speed lever.

The above objects and advantages of the present invention will become apparent from the following description with the accompanying drawings.

DETAILED DESCRIPTION OF THE INVENTION

In a transmission operating device shown in FIGS. 1 to 4, numeral 1 is a frame fixed to a floor of a motorcar, or the like. A ball member 4 of a first ball joint 3 is fixed on a lowered portion 2 of the frame 7 by means of a nut 5. A socket 6 of the first ball joint 3 is fixed to an lower end of a change speed lever 7. The change speed lever 7 can be operated in the direction of Arrow A or Arrow B, i.e. in a first plane parallel to the sectional plane taken along a line of Y—Y in FIG. 2 based on the function of the first ball joint. Further, the change speed lever 7 can be also operated in the direction of Arrow C or Arrow D, i.e. in a second plane parallel to a sectional plane taken along a line of X—X in FIG. 2. In that case, the change speed lever 7 can be operated in the direction of Arrow C or Arrow D after operating in the direction of Arrow A or Arrow B.

The change speed lever 7 has a boss 8 at a position higher to some extent than the position of the socket 6 of the first ball joint 3. An axis P8, which is a second axis, of the boss 8 horizontally extends in the direction perpendicular to an axis of the change speed lever 7.

Figure 2:
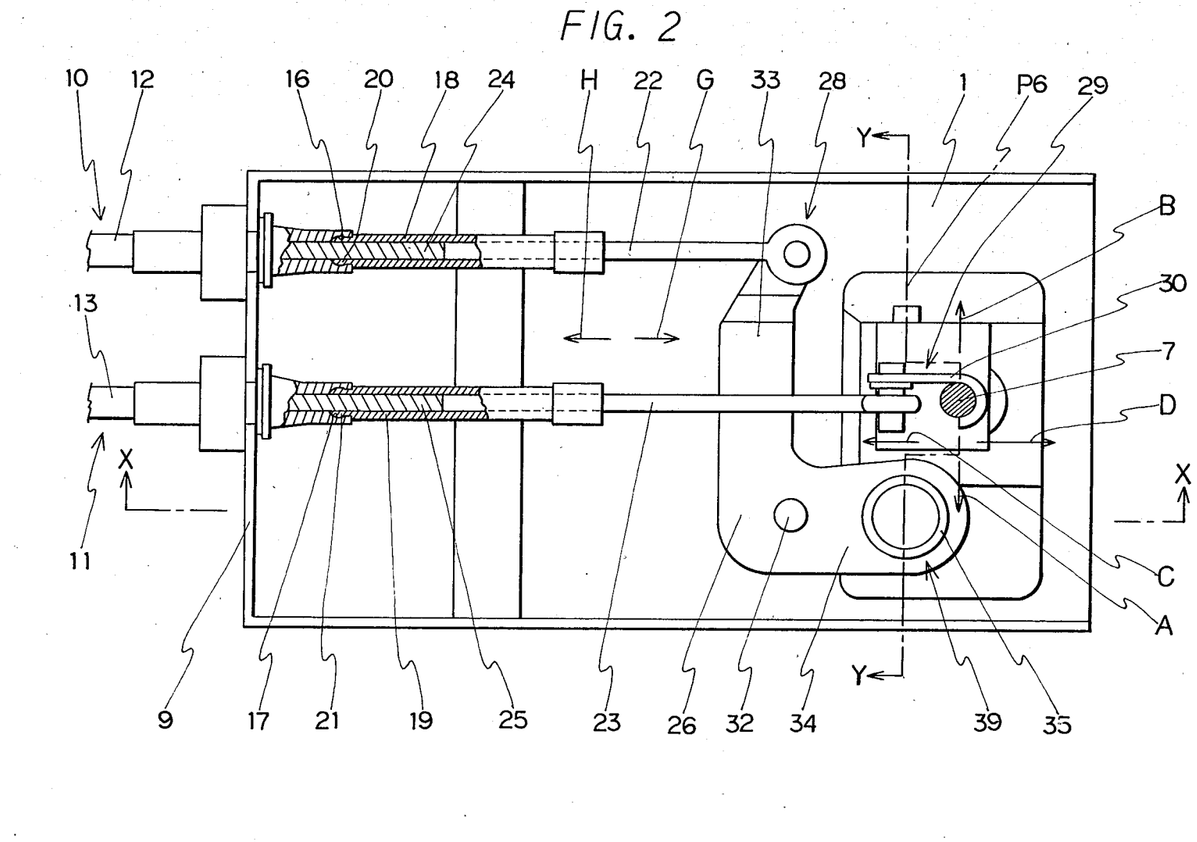
FIG. 2 is a plan view of the device shown in FIG. 1.

As shown in FIG. 2, the first control cable 10 for selecting operation and the second control cable 11 for shifting operation horizontally extend from a transfor mission toward a rear wall 9 of the frame 1 and the conduits 12, 13 of the control cables 10, 11 are fixed to the wall 9 via cable caps 14, 15, or the like. The cable cap 14, 15 has a portion 16, 17 like a socket (hereinafter referred to as "socket-like-portion") at an inner peripheral surface of an end thereof. A guide pipe 18, 19 has a portion 20, 21 like a ball (hereinafter referred to as "ball-like-portion") at an outer peripheral surface of an end thereof. The ball-like-portion 20, 21 of the guide pipe 18, 19 is pivotally engaged with the socket-like-portion 18, 19 of the cable cap 14, 15, like a ball joint. An end portion of a rod 22, 23 is inserted into the guide pipe 18, 19 so as to rotate around an axis of the rod and slide within the guide pipe 18, 19. The end of the rod 22, 23 is connecte,d with an end of the inner wire 24, 25 of the control cable 10, 11.

Figure 1:
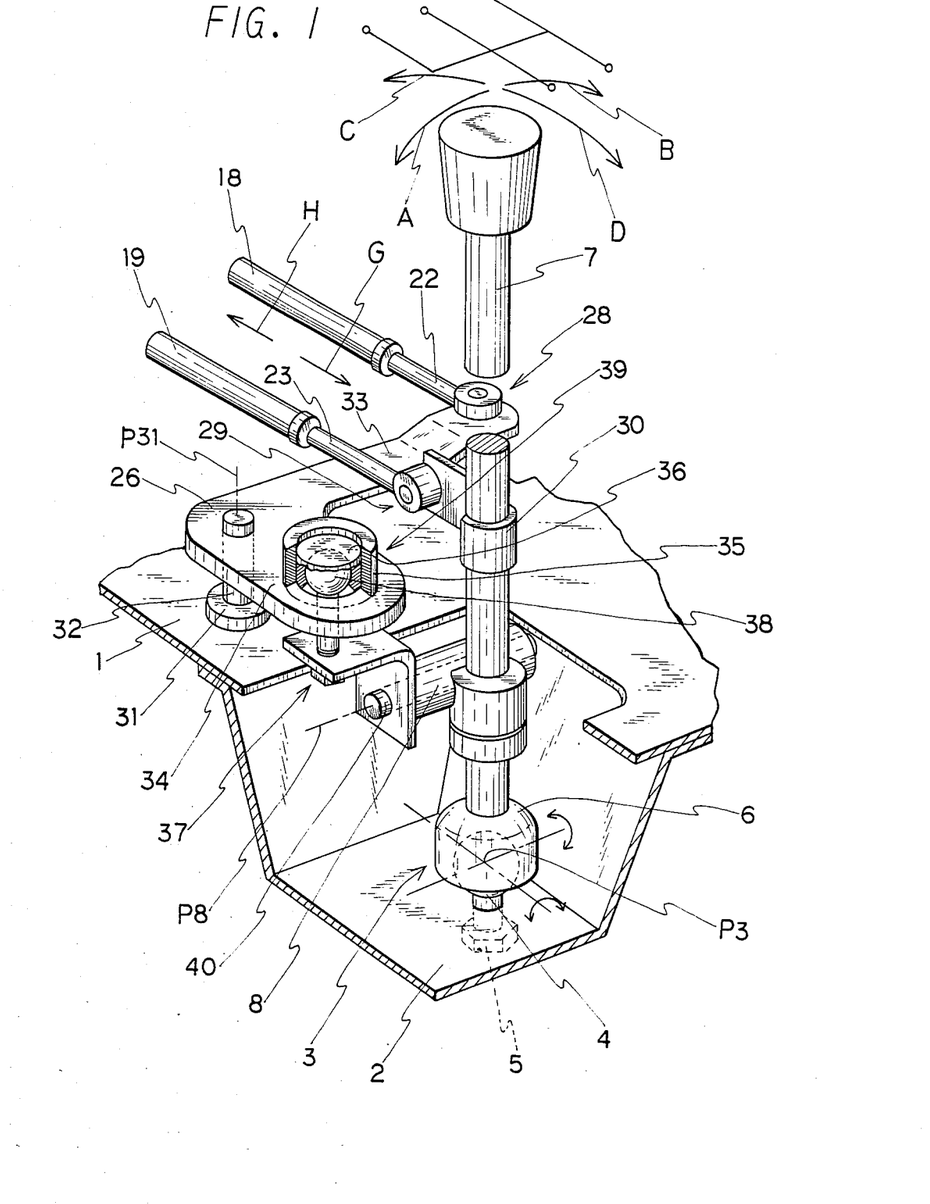
FIG. 1 is a partially cutaway perspective view showing an embodiment of transmission operating device of the present invention.

The other end of the rod 22 is connected with an first arm 33 of a bell crank 26 described later via a pin joint 28, or the like. The other end of the rod 23 is connected with the change speed lever 7 via a pin joint 29, or the like. A J-shaped plate 30 of the pin joint 29 is fixed to the change speed lever 7, as shown in FIG. 1.

Figure 3:
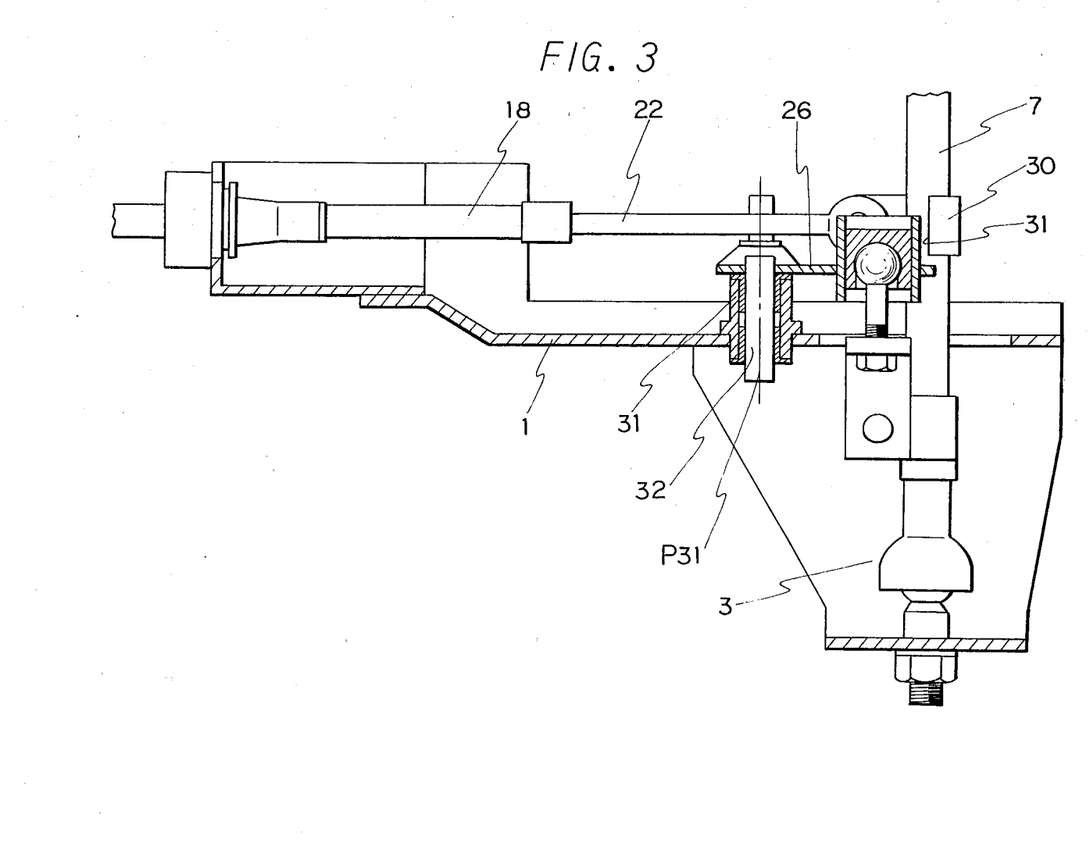
FIGS. 3 and 4 are sectional views taken along lines Y—Y and X—X, respectively.

A boss 31 having an axis P31, which is a first axis, extending in the vertical direction is fixed on the frame 1. An axial member 32 of the bell crank 26 is rotatably supported by the boss 31, as shown in FIG. 3.

The bell crank 26 has a first arm 33 extending in the direction substantially perpendicular to the first control cable 10 and a second arm 34 extending in the direction substantially parallel to the second control cable 11. The other end of the rod 22 is connected with an end of the first arm 33, as described above. A tubular boss 35 is provided at an end of the second arm 34. A socket 36 is contained in the boss 35 so as to slide in the axial direction thereof. The socket 36 receives a ball member 38 provided at an upper end of a connecting link 37. A second ball joint 39 comprises the socket 36 and the ball member 38. An axial member 40 rotatably supported by the boss 8 of the change speed lever 7 is provided at a lower end of the connecting link 37. In that case, the axial member 40 cannot slide within the boss 8 in the direction of an axis of the member 40. The combination of the socket 36 being able to slide in the axial direction of the boss 35 and the axial member 40 being rotatably supported by boss 8, allows the distances between the connecting link 37 and the change speed lever 7 or the bell crank lever 26 to be lengthened or shortened.

Figure 4:
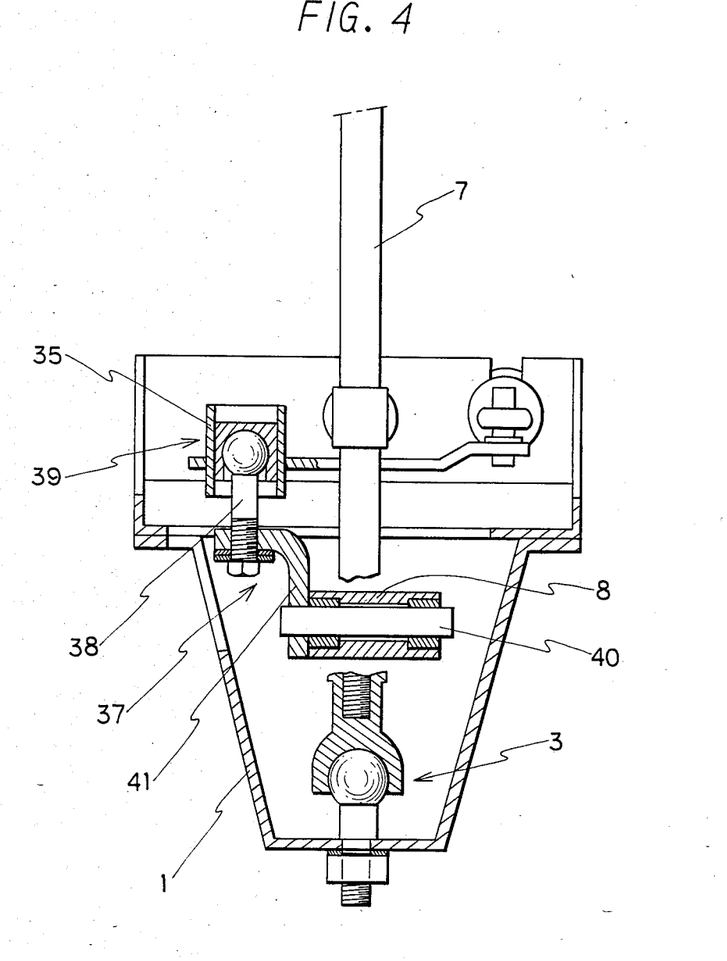

As shown in FIG. 4, the connecting link 37 can comprise an L-shaped plate 41, the axial member 40 perpendicularly fixed to the side surface of the plate 41 and the ball member 38 perpendicularly fixed to the upper surface of the plate 41.

The operation of the transmission operating device is described below.

Figure 5:
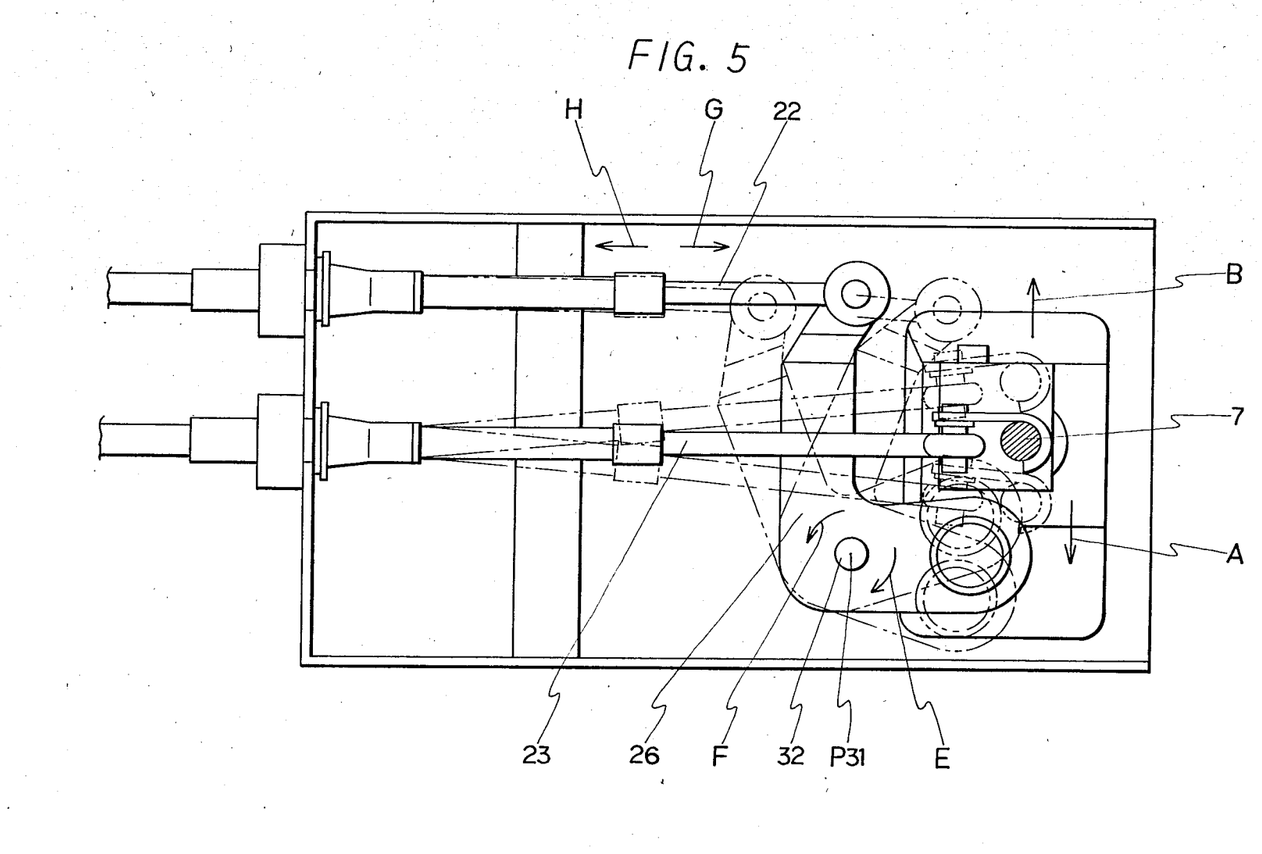
FIGS. 5 to 7 are schematic views showing the operating states of the device shown in FIG. 1, respectively.
Figure 6:
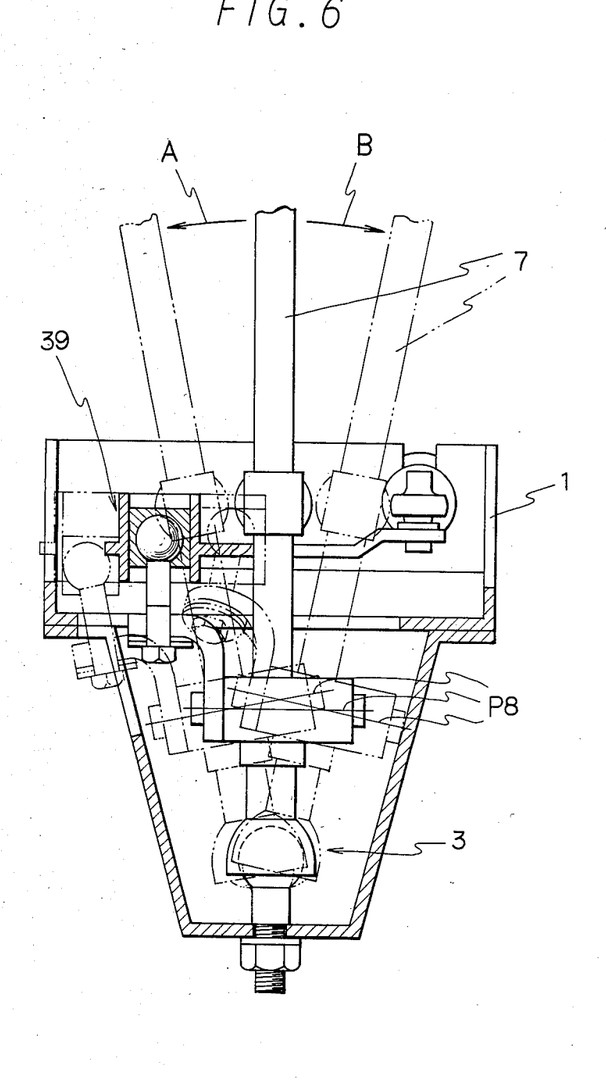

As shown in FIGS. 5 and 6, when operating the change speed lever 7 in the direction of Arrow A or Arrow B, the boss 8 of the change speed lever 7 and the axial member 40 of the connecting link 37 are also moved in the same direction. On the other hand, the ball member 38 of the connecting link 37 is guided in a cylindrical surface of which a center line is the axis P31 and of which a radius is a length between the axis P31 and the center of the boss 35. Accordingly, at the same time that the connecting link 37 rotates around the axis P8, as shown in FIG. 6 with imaginary lines, the motion of the change speed lever 7 in the direction of Arrow A or Arrow B generates the rotational motion of the bell crank 26 in the direction of Arrow E or Arrow F. As a result, the rod 22 and the inner wire 24 of the first control cable 10 are pushed or pulled in the direction of Arrow H or Arrow G, so that the selecting operation can be performed. In that case, the guiding pipe 19 of the second control cable 11 is pivotally moved in the direction of Arrow A or Arrow B with respect to a center of the ball-like-portion 21 of the guide pipe 19, following to the operation of the change speed lever 7 in the direction of Arrow A or Arrow B. However, the rod 23 and the inner wire 25 are not substantially pushed or pulled in the direction of Arrow H or Arrow G.

Figure 7:
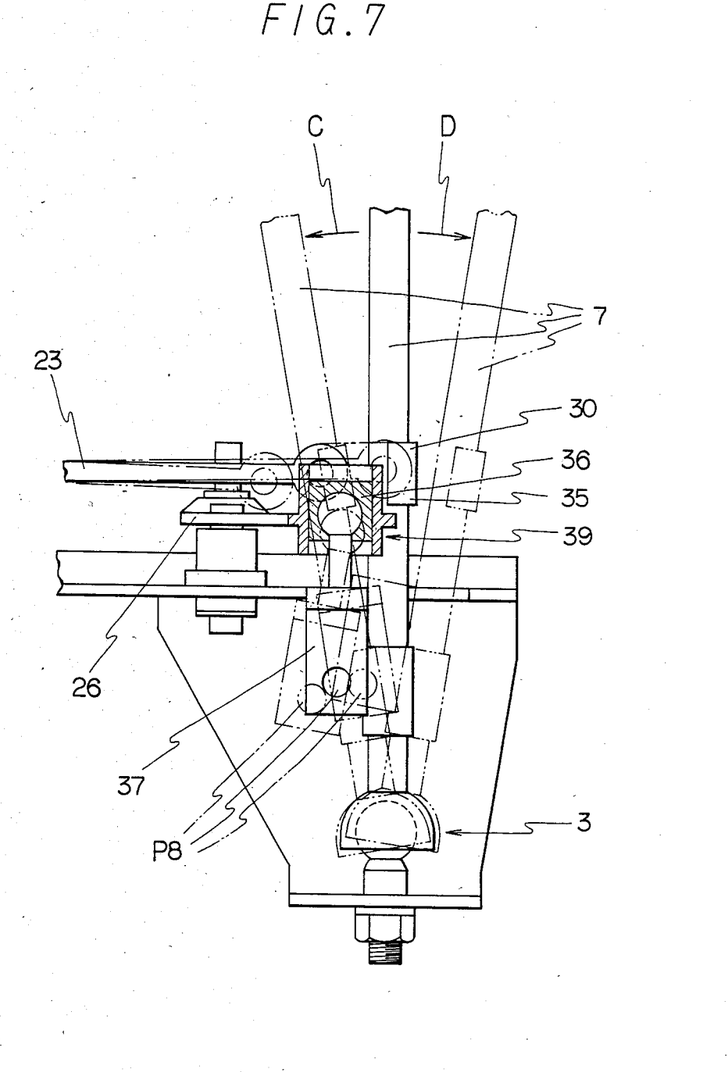

When the change speed lever 7 is operated in the direction of Arrow C or Arrow D from the neutral position (shown in FIG. 7 with full lines) or a position where the change speed lever 7 is operated in the direction of Arrow A or Arrow B, the rod 23 and the inner wire 25 of the second control cable 11 are pushed or pulled in the direction of Arrow C or Arrow D, as shown in FIG. 7. As a result, the shifting operation can be performed. In that case, even if operating the change speed lever 7 in the direction of Arrow C or Arrow D, the bell crank 26 is not rotated, since the connecting link 37 rotates around the axis P8 of the boss 8 provided to the change speed lever 7 and the socket 36 slides in the vertical direction within the boss 35. As a result, the inner wire of the first control cable 10 for selecting operation is not pulled and pushed.

Further, the change speed lever 7 does not rotate around an axis of the lever 7, since the rod 23 of the second control cable 11 is connected with the change speed lever 7 via the pin joint 29 and the bell crank 26 is connected with the change speed lever 7 via connecting link 37. Therefore, it is not necessary to provide the mechanism 57 in the conventional device shown in FIG. 9 so as to prevent the change speed lever 7 from rotating around the axis of the lever 7.

In the device shown in FIGS. 1 to 7, the connecting link 37 extends parallel to the change speed lever 7, i.e. in the vertical direction and crosses with the second arm 34 of the bell crank 26. However, the present invention is not limited to such a structure. For example, the present invention may be constructed so that a connecting link 37A extends in the horizontal direction and crosses with a second arm 34A of a bell crank lever 26A, as shown in FIG. 8.

Figure 8:
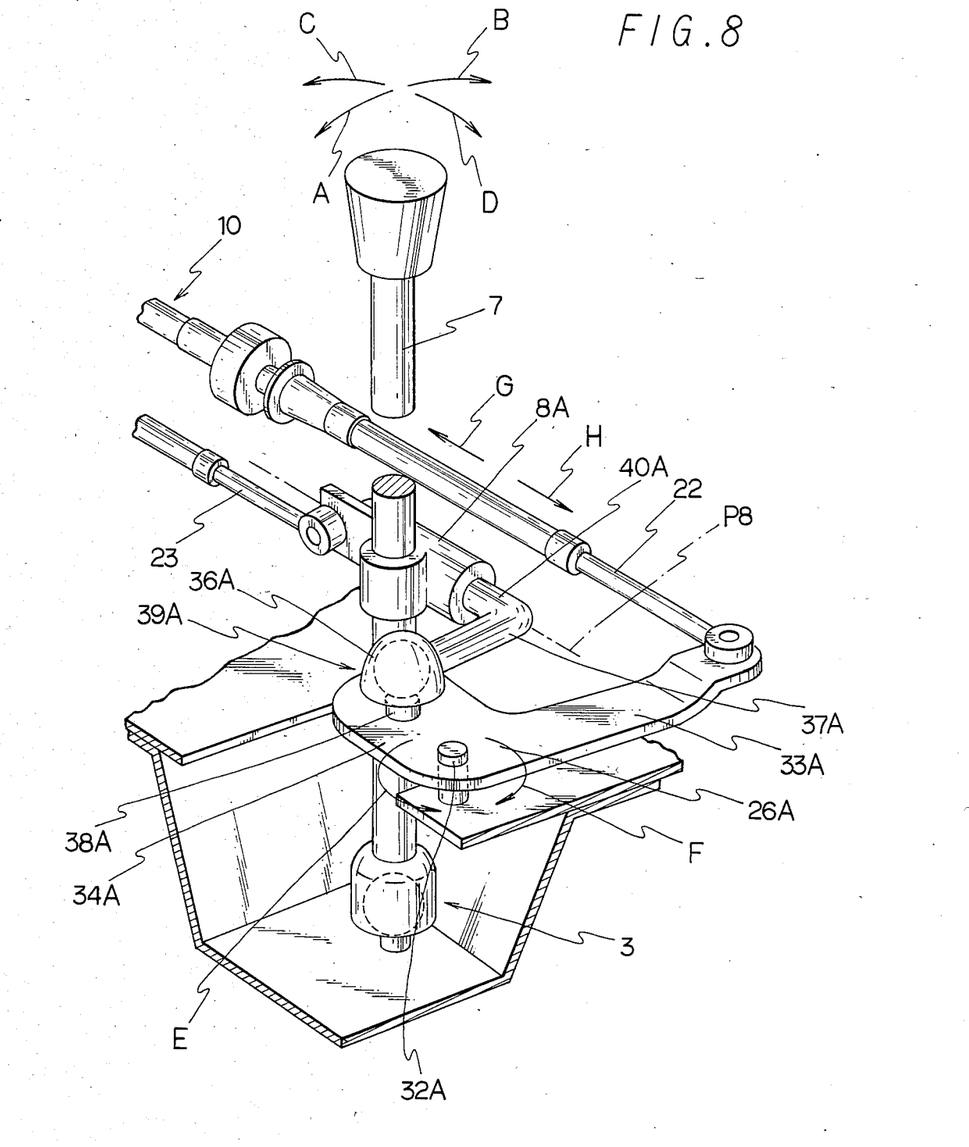
FIG. 8 is a partially cutaway perspective view showing another embodiment of the device of the present invention.

In the device shown in FIG. 8, an axis P8 of a boss 8A provided to the change speed lever 7 extends parallel to the rod 22 connected with the first control cable 10. A connecting link 37A swings in a plane crossing with the rod 22 of the first control cable 10 during a selecting operation. A first arm 33A of a bell crank 26A is situated on this side in the drawing and extends horizontally and in the direction crossing with the first control cable 10. The connecting link 37A and a second arm 34A of the bell crank 26A are pivotally jointed with each other via a second ball joint 39A comprising a ball member 38A fixed to the second arm 34A and a socket 36A provided to an end of the connecting link 37A and directed downwardly.

In the second ball joint 39A in the device shown in FIG. 8, it is not necessary to provide the slidable mechanism between the boss 35 and the socket 36 shown in FIGS. 1 to 7. In that case, the axial member 40A is slidably connected with the boss 8A.

The device shown in FIG. 8 is similar to the device shown in FIGS. 1 to 7 in respects of the engagements between the change speed lever 7 and the frame 1 by means of the first ball joint 3, between the rod 23 of the second control cable and the change speed lever 7, and between the rod 22 of the first control cable 10 and the bell crank 26A.

In the device shown in FIG. 8, when operating the change speed lever 7 in the direction of Arrow A or Arrow B, the motion is transmitted to the bell crank 26A via the connecting link 37A and the bell crank 26 rotates in the direction of Arrow E or Arrow F. Therefore, the rod 22 of the first control cable 10 is moved in the direction of Arrow G or Arrow H. In that case, though the rod 23 of the second control cable 11 swings in the direction of Arrow A or Arrow B, the rod 23 is little pushed or pulled.

Further, when the change speed lever 7 is operated in the direction of Arrow C or Arrow D, the rod 23 is pushed or pulled in the direction of Arrow G or Arrow H. However, the bell crank 26A does not rotate, since the boss 8A slides on the axial member 40A. Therefore, the rod 22 of the first control cable 10 is not also pushed or pulled.

When operating the change speed lever 7 in the direction of Arrow A or Arrow B, the second ball joint 39A moves to some extent in the direction of Arrow H, since the first arm 33A of the bell crank 26A rotates around the axial member 32A. The motion is absorbed by moving the change speed lever 7 in the direction of Arrow D. However, the second control cable for shifting operation does not receive any effect by the motion, since such a motion is avoided by engaging the boss 8A with the axial member 40A of the connecting link 37A so as to slide in the axial direction.

Further, when rotatably engaging the connecting link 37A with the axial member 40A, or when rotatably engaging the change speed lever 7 with the boss 8A, the change speed lever 7 is more smoothly operated in the direction of Arrow C or Arrow D.

In the transmission operating device of the present invention, the mechanism for transmitting the operational force from the change speed lever to the control cables is sporadically applied to the middle portion of the change speed lever, the upper portion above the frame, or the like. Therefore, the arrangement of each part is balanced. Further, the detailed design, the assembling work and the maintenance work are simplified. Further, though a ball joint which is a simple structure is used as the mechanism for supporting the change speed lever on the frame, it is not necessary to provide the mechanism for preventing the change speed lever from rotating around the axis of itself. Therefore, all of the structure is more simplified.

What is claimed is:

1. A transmission operating device comprising:
  (a) a frame;
  (b) a first ball joint provided on a lowered portion of the frame;
  (c) a change speed lever supported on the frame by means of the first ball joint;
  (d) a first control cable and a second control cable extending in the plane crossing with an axis of the change speed lever and being arranged substantially parallel to each other;
  (e) a bell crank being provided on the frame so as to rotate around a first axis extending substatially parallel to the change speed lever and having a first arm extending in the direction crossing with the first control cable and a second arm extending substantially parallel to the second control cable; and
  (f) a connecting link of which one end is connected with the change speed lever so as to rotate around a second axis crossing with the axis of the change speed lever, and of which the other end is connected with the second arm by means of a second ball joint, and extending in the direction crossing with the second arm,
  wherein one end of the first control cable is connected with the first arm, and one end of the second control cable is connected with the change speed lever.

2. The device of claim 1, wherein the connecting link is substantially parallel to the change speed lever, and the second axis is substantially parallel to a plane including the connecting link and perpendicular to the second arm.

3. The device of claim 2, wherein a distance between a position connecting the change speed lever with the connecting link and a position connecting the bell crank lever with the connecting link can be changed so as to be lengthened or shortened.

4. The device of claim 1, wherein the connecting link extends substantially parallel to the first arm, and the second axis and the second arm extends substantially parallel to each other.

* * * * *